Dec. 14, 1937. W. A. WISSLER 2,101,970
VALVE SEAT
Filed July 26, 1933

INVENTOR
WILLIAM A. WISSLER
BY
ATTORNEY

Patented Dec. 14, 1937

2,101,970

UNITED STATES PATENT OFFICE 2,101,970

VALVE SEAT

William A. Wissler, Flushing, N. Y., assignor, by mesne assignments, to Union Carbide and Carbon Corporation, a corporation of New York Application July 26, 1933, Serial No. 682,181

3 Claims. (Cl. 123—188)

This invention relates to the fabrication of metallic structures which are subject to wide variations of temperature and more particularly relates to composite valve ports having high resistance to wear and to oxidation and also being suitable for use in engine blocks and valve bodies made of metals, such as aluminum and aluminum-base alloys, having high coefficients of expansion.

Heretofore valve parts of alloyed metals such as the cobalt-chromium-tungsten alloys and valve parts of similar, hard, long-wearing and non-oxidizing alloys have been successfully employed in cast iron engine blocks and valve bodies. The wearing quality of the cobalt-chromium-tungsten alloy known as "Stellite" is unsurpassed as a coating on automotive valves and has the additional advantageous feature of resisting the tendency of carbon to deposit on the surface of the valve. However, where valve seats of the usual type comprising a ring of steel covered with an alloy, such as "Stellite" or any other non-oxidizing and wear resistant alloy, have been mounted in engine blocks of aluminum or in blocks of other metals, such as aluminum-base alloys, having relatively high coefficients of linear expansion, the valve seats have become loosened when the engine temperature increased under operation because the degree of expansion of the aluminum is so much greater than that of the steel. Solid "Stellite" valve seats have been found to loosen in the engine block in much the same manner as the steel rings and have likewise been unsatisfactory.

Figure 2:
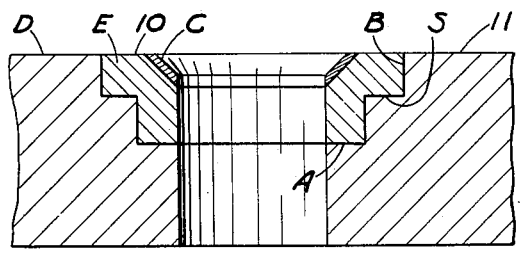
Figure 3:
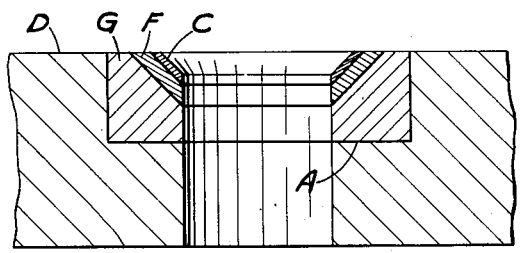

Therefore, an object of this invention is to provide an improved union between metallic parts, having widely different coefficients of expansion, wherein the parts will remain inseparably joined together under heat changes encountered within the range of normal use. Another object of this invention is to provide an improved union between a valve seat and an engine block which will not permit loosening of the seat under high engine operating temperatures. Other aims, objects and novel features of this invention will be apparent from the following description and accompanying drawing, of which Fig. 1 is a sectional view showing the application of the invention to one form of valve seat shrunk into place in the head of an engine block;

Fig. 2 is a sectional view of an alternative form of valve seat similarly shrunk into place in an engine block; and Fig. 3 is a sectional view of a construction in which the valve seat is comprised of a surfacing metal and intermediate layers of metal of graded coefficients of linear expansion between the surfacing metal and the metal of the engine block.

Figure 1:
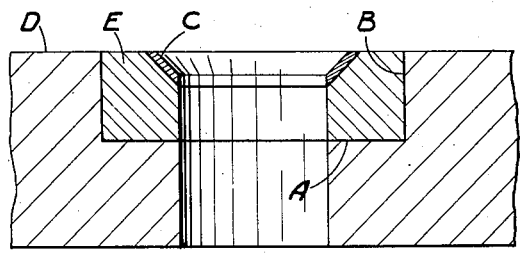

In the preferred embodiment of the invention, as shown in Fig. 1 of the drawing, there may be provided a valve part, as a seat A, secured within a drilled opening B of a block D of an internal combustion engine or of a valve body, and this seat may comprise a ring E of bronze or other suitable metallic material, which has been fused onto a ring C of a cobalt-chromium-tungsten alloy, such as "Stellite" or other similar alloy. Bronze or any suitable metal which has a coefficient of linear expansion intermediate between that of the block and the coating alloy is particularly adaptable for forming a valve seat.

The composite ring, of alloy and bronze, may be connected with the block D by shrinking, expanding or otherwise fixing the ring within the drilled opening B or within a suitable annular groove in the block where it will remain tightly in place at temperatures above the ordinary operating temperature of the block. A similar ring may be shrunk or fitted onto the valve head, although, since the usual composition of the valve head is of steel, it is customary practice to fuse a hard wearing alloy directly to the contacting or bearing surface of the valve. The following materials other than bronze may form the base for valve seats in aluminum blocks or in blocks formed of metals of coefficients of linear expansion comparable to that of aluminum: silver, having a coefficient of expansion of 0.000019, austenitic steels of 18% chromium and 8% nickel composition, and other closely related alloy steels, having a coefficient of expansion of approximately 0.000018. The coefficients of expansion of these metals, it will be noted, are close to or the same as that of bronze which is 0.000018.

The expansion coefficients are here expressed in unit change per unit of length per degree centigrade. The coefficient of cobalt-chromium-tungsten and similarly constituted surfacing alloys is about 0.000015, while that for aluminum is 0.000023. It will be readily appreciated that the expansion coefficients of the bronze, silver, austenitic steels and alloy steels of composition closely related to the austenitic steels are intermediate between the expansion coefficients of aluminum and the alloys of cobalt-chromium-tungsten referred to above.

In accordance with this invention the composite valve seat may be built up by applying a ring of wear resisting material, or of steel coated with a wear resisting material, to a basic annulus of metal which has a coefficient of linear expansion intermediate of the coefficient of the ring of wear resisting material and of the coefficient of the metal comprising the engine block.

The ring of wear resisting material or of steel coated with such material may have a basic annulus fused thereto by well known methods. Among these methods is the one of applying bronze from a welding rod in the presence of a suitable flux and under high temperature heat, such as may be derived from an oxy-acetylene blowpipe. Or a valve seat having a hard surface may be obtained by placing a ring of surfacing alloy in a mold and covering with a suitable flux. The bronze or other metal having an intermediate coefficient of expansion is then fused to the ring by applying high temperature heat to a welding rod of the particular metal. When the mass has been allowed to cool, a composite ring is formed which is removed from the mold and machined on the outer surface in order to be fitted into place in the port opening of the engine block D. By this method of forming such rings, the machining necessary to adapt the rings to the apertures in the cylinder blocks is materially reduced, since they may be cast very nearly to the correct size and shape.

As shown in Fig. 2, the outer surface of the valve seat or ring may be machined or shaped to provide a stepped shoulder S. The opening B in the block D may have a similarly shaped shoulder for cooperating with the shoulder S of the seat so as to prevent possible slippage between the seat and the block. In this manner the face of the valve seat tends to remain in its original position and the upper surface 10 of the ring A is substantially always in permanent flush alignment with the head 11 of the block.

It is preferred to employ as a surfacing material an alloy having constituents as follows:

Tungsten....about.. 2 to 5%
Chromium....do.... 30 to 35%
Cobalt................ Major portion of the balance
Iron, carbon, nickel... Minor portion of the balance each being less than 1%

However, alloys may be used which are comprised of the following constituents in percentages within the ranges as indicated:

Tungsten....about.. 0 to 20%
Chromium....do.... 10 to 40%
Cobalt................ Major portion of the balance
Iron, carbon, nickel... Minor portion of the balance
Molybdenum........ As a substitute for tungsten
Vanadium.......... In addition if desired, about 0 to 5%

It will be understood also that a valve seat may be employed in connection with the block D which seat is built up of a plurality of annular metallic layers F and G, as shown in Fig. 3 of the drawing, and these layers may be constructed of selected metals or metallic alloys which will result in a substantially uniform gradation in coefficients of expansion between the metal of the cylinder block D and that of the wear resisting surfacing C of the valve seat. While there are only two such intermediate layers shown in Fig. 3, it is to be understood that the number can be varied within practical limits as the situation may require and that the layers and other parts may be annular, flat or of any other shape as desired.

I claim:—

1. In combination with an aluminum or aluminum base alloy engine element having at least one valve port therein, said element having a relatively high coefficient of thermal expansion, a valve seat secured within said port, said valve seat comprising a metal ring secured to the inner periphery of said port, a surface metal layer on said metal ring of a wear and oxidation resistant metal having a relatively low coefficient of thermal expansion, said metal ring being of a metal having a coefficient of thermal expansion intermediate between, and substantially different from, that of said aluminum or aluminum base alloy and that of said wear and oxidation resistant surface metal.

2. A combination as claimed in claim 1, wherein said metal ring is composed of austenitic steel and said surface metal consists chiefly of cobalt, chromium, and tungsten.

3. A combination as claimed in claim 1, wherein said metal ring is composed of bronze and said surface metal consists chiefly of cobalt, chromium, and tungsten.

WILLIAM A. WISSLER.